(12) United States Patent
Cregg et al.

(10) Patent No.: US 6,970,072 B1
(45) Date of Patent: Nov. 29, 2005

(54) HOME AUTOMATION MODULE HAVING EXTERNALLY POWERED COMMUNICATIONS PORT

(75) Inventors: Daniel Brian Cregg, Orange, CA (US); Donald John Bartley, Aliso Viejo, CA (US); Ronald Jeffrey Walter, Anaheim, CA (US); Derek Robert Henry, Orange, CA (US); Joseph J Dada, III, Newport Beach, CA (US)

(73) Assignee: Smarthome, Inc., Irvine, CA (US)

( * ) Notice: Subject to any disclaimer, the term of this patent is extended or adjusted under 35 U.S.C. 154(b) by 62 days.

(21) Appl. No.: 10/448,680

(22) Filed: May 29, 2003

(51) Int. Cl.[7] ............................................. H04M 11/04
(52) U.S. Cl. ...................... 340/310.04; 340/310.01; 340/310.08; 340/333; 340/693.2
(58) Field of Search .................. 340/310.01, 310.04, 340/310.08, 333, 693.2, 693.1, 693.3, 693.4

(56) References Cited

U.S. PATENT DOCUMENTS

| 4,200,862 A | 4/1980 | Campbell et al. ........... 340/310 |
| 5,297,015 A * | 3/1994 | Miyazaki et al. ........... 363/146 |

* cited by examiner

*Primary Examiner*—Daryl C. Pope
(74) *Attorney, Agent, or Firm*—Thelen Reid & Priest LLP; Steven J. Robbins

(57) ABSTRACT

A home automation module having an externally powered communications port. The module includes an automation microprocessor for controlling the module, a communications port for enabling the module to draw power in limited quantities from an external source, a receiver/transmitter section, a power line carrier (PLC) coupler for enabling the transfer of signals between the module and a main while electrically isolating the module from the main, a zero-crossing detector for monitoring the phase of the power on the main while maintaining substantial electrical isolation of the module from the main, and a boost regulator for enabling the module to derive sufficient power from the communications port to drive the PLC coupler during signal transmissions from the module to the main. The detector maintains substantial electrical isolation through an opto-isolator. The boost regulator stores up power over time so that sufficient power will be available when the demand is made.

11 Claims, 2 Drawing Sheets ically been integrated and the remote control of systems that may not have historically been remotely controlled. For example,
HOME AUTOMATION MODULE HAVING EXTERNALLY POWERED COMMUNICATIONS PORT

FIELD OF THE INVENTION

The present invention relates generally to home automation products. More specifically, the present invention relates to home automation modules that have an externally powered communications port.

BACKGROUND OF THE INVENTION

As part of an effort to make home life more convenient, safe, and entertaining, home automation products have been developed. These products enable the home owner to perform and monitor various tasks in an automated or semi-automated fashion. A wide range of tasks are feasible involving assorted systems of the home including the lighting, climate control, security, maintenance, and entertainment systems, among others. Home automation also enables the integration of systems that may not have historically been integrated and the remote control of systems that may not have historically been remotely controlled. For example, with proper equipment and set up, it would be possible with one push of a button to close the drapes if it was too bright outside, dim the lights if it was too bright inside, turn on the television if it was not already on, turn on the surround sound tuner if it was not already on, turn on the DVD player if it was not already on, place the television in the proper video mode, place the tuner in the proper audio mode, and start a DVD playing. Both less complicated and even more complicated examples also exist using the same or different systems individually or in combination.

Generally, a home automation system includes a central processor, a plurality of controllers, and some means of communicating between and among the central processor and the controllers. The controllers may also perform some data collection and processing. In one such system, the communication is carried over the power lines of the dwelling. This allows the system to be retrofitted into an existing structure with less inconvenience and expense. The central processor and controllers each form modules that are coupled to the power lines through the power receptacles of the residence. The modules communicate with one another by way of signals placed on the power lines. A communications protocol exists whereby transmitters transmit messages and receivers receive messages. Each module may be a transmitter, a receiver, or both. Each module may have at least some user interface. The user interface may be as simple as a power receptacle or a switch. By necessity, the user interface for the central processor may be much more complicated. It is also possible for a module to be connected to an external user interface such as a personal computer and the like. The computer may also perform command and control functions. Connecting the home automation system to the computer takes advantage of an existing and familiar user interface and the processing and connectivity power of the computer. The module may only be temporarily connected to the external user interface. The connection period may also be more prolonged depending on the circumstances.

Among the more conventional means of connecting a module to an external user interface such as a computer is through an industry standard often referred to as RS232. The RS232 communications protocol is a well known serial data link between devices. Despite this fact, it is not always followed exactly as presented by the Electronic Industries Association. Over the over thirty years since this standard was developed, the EIA has published three modifications with the most recent being the EIA232E standard introduced in 1991. Besides changing the name from RS232 to EIA232, some signal lines were renamed and various new ones were defined, including a shield conductor. The point of connection at each device is referred to as a communications port. The protocol does not include provisions for one device to supply any significant amount of power over the link to other devices to which it is connected. Consequently, each device must include an internally powered communications port. Traditionally, this has not presented a major obstacle in the home automation environment as each module was already connected to the power lines of the home for communication with other modules in the system. It is important to note however that the module power supply must be an isolated one to prevent potential electrical problems with the connection between the module and the computer. Other non-powered communications protocols similar to that of RS232/EIA232 exist as well.

BRIEF DESCRIPTION OF THE INVENTION

A home automation module having an externally powered communications port is disclosed. The module includes an automation microprocessor for controlling the module, a communications port for enabling the module to draw power in limited quantities from an external source, a receiver/transmitter section, a power line carrier (PLC) coupler for enabling the transfer of signals between the module and a main while electrically isolating the module from the main, a zero-crossing detector for monitoring the phase of the power on the main while maintaining substantial electrical isolation of the module from the main, and a boost regulator for enabling the module to derive sufficient power from the communications port to drive the PLC coupler during signal transmissions from the module to the main. The detector maintains substantial electrical isolation through an opto-isolator. The boost regulator stores up power over time so that sufficient power will be available when the demand is made.

BRIEF DESCRIPTION OF THE DRAWINGS

The accompanying drawings, which are incorporated into and constitute a part of this specification, illustrate one or more exemplary embodiments of the present invention and, together with the detailed description, serve to explain the principles and exemplary implementations of the invention.

In the drawings.

DETAILED DESCRIPTION OF THE INVENTION

Various exemplary embodiments of the present invention are described herein in the context of home automation modules that have an externally powered communications port. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to exemplary implementations of the present invention as illustrated in the accompanying drawings. The same reference indicators will be used throughout the drawings and the following detailed descriptions to refer to the same or like parts.

In the interest of clarity, not all of the routine features of the exemplary implementations described herein are shown and described. It will of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
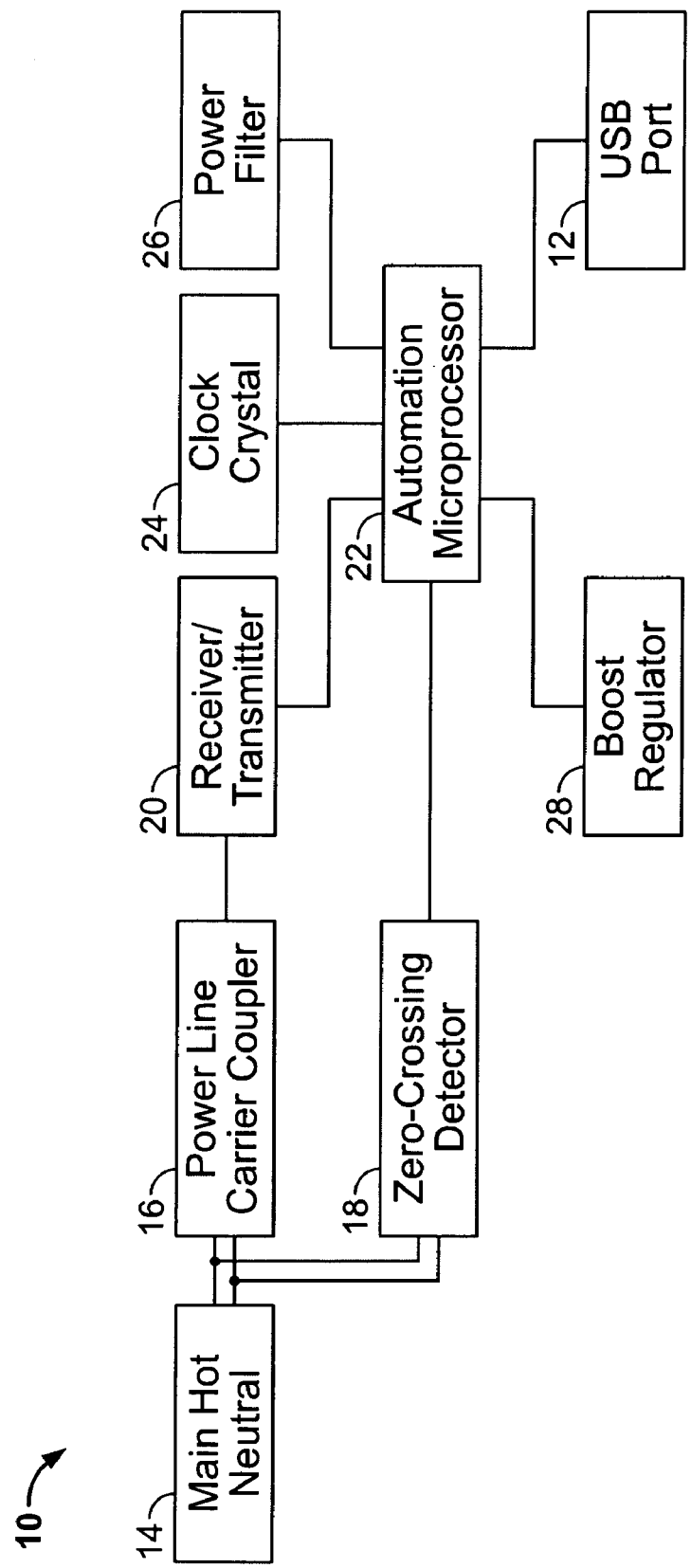
FIG. 1 is a block diagram according to the present invention of a home automation module having an externally powered communications port.

Turning first to FIG. 1, a block diagram according to the present invention of a home automation module 10 having an externally powered communications port is shown. In this instance, the externally powered communications port is a universal serial bus (USB) port 12. Other externally powered communications ports exist and can be treated similarly. The USB protocol is well known and includes provisions for one device to supply a defined amount of power over the link to other devices to which it is connected. The amount of power is limited however. In this instance, the module 10 is drawing power from the USB port 12. The module 10 is coupled twice to a main 14 having a hot and a neutral. The first coupling is through the power line carrier (PLC) coupler 16. The PLC coupler 16 enables the transfer of signals between the module 10 and the main 14. The PLC coupler 16 also electrically isolates the module 10 from the main 14. The second coupling is through the zero-crossing detector 18 which will be discussed in greater detail below. The detector 18 monitors the phase of the power on the main 14 while maintaining substantial electrical isolation of the module 10 from the main 14. Shown connected to the PLC coupler 16 is a receiver/transmitter (R/T) section 20. The R/T section 20 is a general depiction of what in practice may include a receiver, a transmitter, a combination receiver/transmitter, or both a receiver and a transmitter. It is also possible that the receiver and transmitter may be separate blocks rather than one as shown. The exact configuration of the R/T section 20 will depend on the circumstances. In any event, the R/T section 20 transfers signals between the module 10 and the main 14 through the PLC coupler 16. The USB port 12, the detector 18, and the R/T section 20 are in turn connected to an automation microprocessor 22. The microprocessor 22 receives various signals from and transmits various signals to the assorted components of the module 10. The microprocessor 22 is the primary command and control component of the module 10. In one embodiment, the microprocessor 22 is an eight bit micro-chip. As shown, the microprocessor 22 may require various external support components such as a clock crystal 24 and a power filter 26. The exact configuration and requirements of the microprocessor 22 will depend on the circumstances. Also connected to the microprocessor 22 is a boost regulator 28 which will be discussed in greater detail below. The boost regulator 28 enables the module 10 to derive enough power from the USB port 12 to drive the PLC coupler 16 during signal transmissions from the module 10 to the main 14. The module 10 may also include other components that are not shown.

Figure 2:
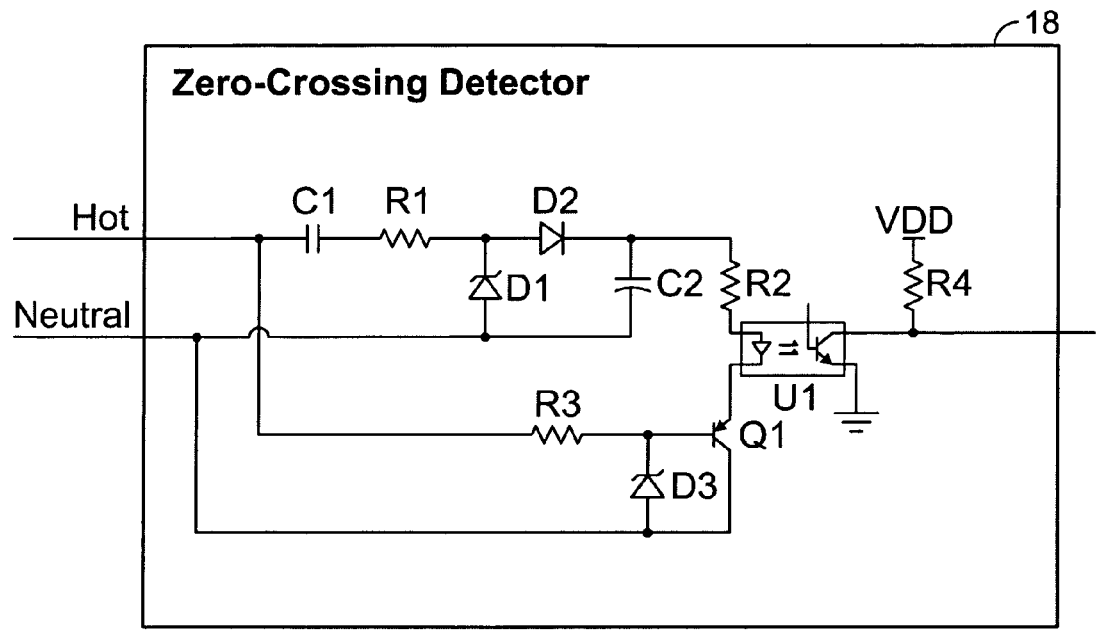
FIG. 2 is a schematic diagram of an embodiment according to the present invention of the zero-crossing detector of FIG. 1.

Turning now to FIG. 2, a schematic diagram of an embodiment according to the present invention of the zero-crossing detector 18 of FIG. 1 is shown. The various electrical components are connected as illustrated. As noted above, the detector 18 monitors the phase of the power on the main 14 of FIG. 1 while maintaining substantial electrical isolation of the module 10 of FIG. 1 from the main 14. As is known by one of ordinary skill in the art, the power phase is used by the module 10 to determine when to transfer signals between itself and the main 14. The detector 18 maintains substantial electrical isolation of the module 10 through an opto-isolator U1. Electrical components depicted to the left of the opto-isolator U1 are powered by the main 14 and electrical components depicted to the right of opto-isolator U1 are powered by the module 10. Based on the circuit represented, the amount of power drawn from the main 14 is relatively insignificant. This is especially so by comparison to a conventional module that has an internally powered communications port.

Figure 3:
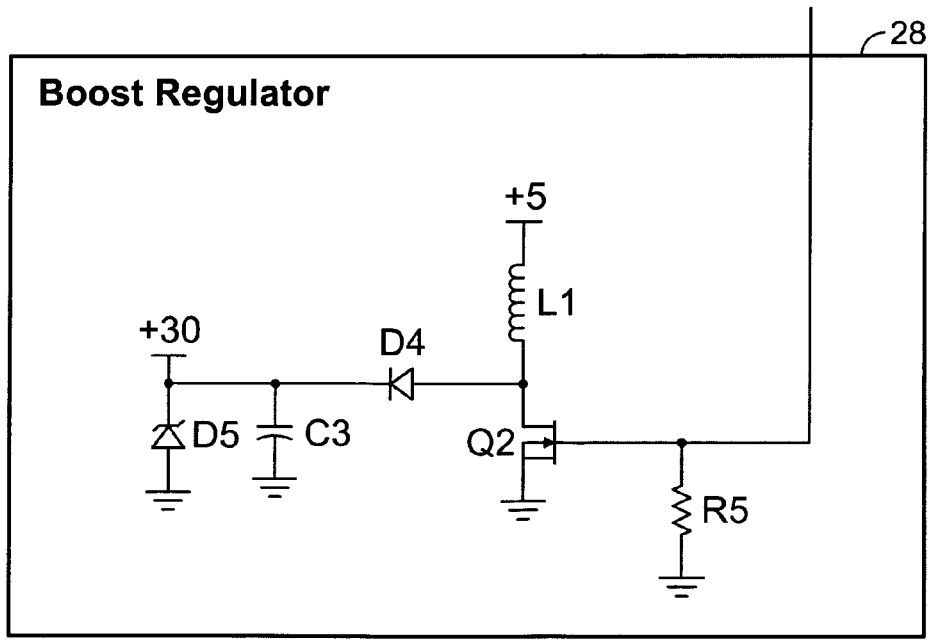
FIG. 3 is a schematic diagram of an embodiment according to the present invention of the boost regulator of FIG. 1.

Turning now to FIG. 3, a schematic diagram of an embodiment according to the present invention of the boost regulator 28 of FIG. 1 is shown. The various electrical components are connected as illustrated. As noted above, the boost regulator 28 enables the module 10 of FIG. 1 to derive enough power from the USB port 12 of FIG. 1 to drive the PLC coupler 16 of FIG. 1 during signal transmissions from the module 10 to the main 14 of FIG. 1. As further noted above, the USB port 12 is capable of supplying a defined amount of power but the amount of power is limited. Under certain circumstances the amount of power available is not sufficient to directly drive the PLC coupler 16 and simultaneously power the other various components of the module 10. To offset this, the boost regulator 28 stores up power over time so that sufficient power will be available when the demand is made by the module 10. In the embodiment illustrated, the boost regulator 28 charges capacitor C6 upon initial start up and then recharges it from then on to compensate for discharging that occurs. The recharging may be constant, random, periodic, on demand, partial, complete, or some combination of these, among others. The boost regulator 28 is controlled at least in part, if hot in substantial part, by the microprocessor 22 of FIG. 1.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A home automation module having an externally powered communications port, the module comprising:
    an automation microprocessor for controlling the module;
    a communications port connected to the microprocessor, wherein the communications port enables the module to draw power in limited quantities from an external source;
    a transmitter having an input and an output, wherein the input is connected to the microprocessor;
    a power line carrier (PLC) coupler having a first connection and a second connection, wherein the first connection is connected to the output of the transmitter and the second connection is connected to a main having a hot and a neutral;
    a zero-crossing detector having an input and an output, wherein the input is connected to the main and the output is connected to the microprocessor; and
    a boost regulator connected to the microprocessor, wherein the boost regulator enables the module to derive sufficient power from the communications port to drive the PLC coupler during signal transmissions from the module to the main.

2. The module as defined in claim 1, further comprising a receiver having an input and an output, wherein the input is connected to the PLC coupler and the output is connected to the microprocessor.

3. The module as defined in claim 2, wherein the zero-crossing detector comprises an opto-isolator.

4. The module as defined in claim 1, wherein the communications port is a universal serial bus port.

5. The module as defined in claim 1, wherein the zero-crossing detector comprises an opto-isolator.

6. The module as defined in claim 1, wherein the zero-crossing detector comprises:
   a first capacitor having a first terminal and a second terminal, wherein the first terminal is connected to the hot;
   a first resistor having a first terminal and a second terminal, wherein the first terminal is connected to the second terminal of the first capacitor;
   a first diode having an input and an output, wherein the input is connected to the neutral and the output is connected to the second terminal of the first resistor;
   a second diode having an input and an output, wherein the input is connected to the second terminal of the first resistor;
   a second capacitor having a first terminal and a second terminal, wherein the first terminal is connected to the neutral and the second terminal is connected to the output of the second diode;
   a second resistor having a first terminal and a second terminal, wherein the first terminal is connected to the output of the second diode;
   a third resistor having a first terminal and a second terminal, wherein the first terminal is connected to the hot;
   a third diode having an input and an output, wherein the input is connected to the neutral and the output is connected to the second terminal of the third resistor;
   a transistor having a first terminal, a second terminal, and a third terminal, wherein the first terminal is connected to the neutral and the second terminal is connected to the second terminal of the third resistor;
   a fourth resistor having a first terminal and a second terminal, wherein the first terminal is connected to the microprocessor and the second terminal is connected to a first voltage potential; and
   an opto-isolator having a first terminal, a second terminal, a third terminal, and a fourth terminal, wherein the first terminal is connected to the second terminal of the second resistor, the second terminal is connected to the third terminal of the transistor, the third terminal is connected to the microprocessor, and the fourth terminal is connected to a second voltage potential.

7. The module as defined in claim 1, wherein the boost regulator comprises:
   a resistor having a first terminal and a second terminal, wherein the first terminal is connected to the microprocessor and the second terminal is connected to a first voltage potential;
   a transistor having a first terminal, a second terminal, and a third terminal, wherein the first terminal is connected to the first voltage potential and the second terminal is connected to the microprocessor;
   an inductor having a first terminal and a second terminal, wherein the first terminal is connected to the third terminal of the transistor and the second terminal is connected to a second voltage potential;
   a first diode having an input and an output; wherein the input is connected to the third terminal of the transistor;
   a capacitor having a first terminal and a second terminal, wherein the first terminal is connected to the first voltage potential and the second terminal is connected to the output of the first diode; and
   a second diode having an input and an output, wherein the input is connected to the first voltage potential and the output is connected to both the output of the first diode and a third voltage potential.

8. A home automation module having an externally powered communications port, the module comprising:
   means for controlling the module;
   a communications port connected to the microprocessor, wherein the communications port enables the module to draw power in limited quantities from an external source;
   means for transmitting signals from the module, wherein the means for transmitting has an input connected to the means for controlling;
   means for coupling the module to a main, wherein the means for coupling is connected to an output of the means for transmitting;
   means for detecting a zero-crossing point of a phase of a power signal on the main, wherein the means for detecting is connected to the means for controlling; and
   means for enabling the module to derive sufficient power from the communications port to drive the means for coupling during signal transmissions from the module to the main, wherein the means for enabling is connected to the means for controlling.

9. The module as defined in claim 8, further comprising means for receiving signals by the module, wherein the means for receiving has an input that is connected to the means for coupling and an output that is connected to the means for controlling.

10. A method for externally powering a home automation module through a communications port that enables the module to draw power in limited quantities from an external source, the method comprising:
   storing sufficient reserve power drawn from the communications port to enable the module to transmit signals from the module to a main, wherein storing comprises:
   storing a first quantity of power at a first time; and
   storing a second quantity of power at a second time subsequent to the first time.

11. An apparatus for externally powering a home automation module through a communications port that enables the module to draw power in limited quantities from an external source, the apparatus comprising:
   means for storing sufficient reserve power drawn from the communications port to enable the module to transmit signals from the module to a main, wherein the means for storing comprises:
   means for storing a first quantity of power at a first time; and
   means for storing a second quantity of power at a second time subsequent to the first time.

* * * * *